US008756933B2

(12) United States Patent
Topliss et al.

(10) Patent No.: US 8,756,933 B2
(45) Date of Patent: *Jun. 24, 2014

(54) CONTROL OF A SHAPE MEMORY ALLOY ACTUATION APPARATUS

(75) Inventors: Richard Topliss, Cambridge (GB); Robert John Leedham, Cambridge (GB); David Charles William Richards, Milton (GB); Thomas Matthew Gregory, Caldecote (GB)

(73) Assignee: Cambridge Mechatronics Limited, Cambridge (GB)

( * ) Notice: Subject to any disclaimer, the term of this patent is extended or adjusted under 35 U.S.C. 154(b) by 1009 days.

This patent is subject to a terminal disclaimer.

(21) Appl. No.: 12/745,784

(22) PCT Filed: Dec. 3, 2008

(86) PCT No.: PCT/GB2008/004015
§ 371 (c)(1),
(2), (4) Date: Jun. 28, 2010

(87) PCT Pub. No.: WO2009/071898
PCT Pub. Date: Jun. 11, 2009

(65) Prior Publication Data
US 2010/0275592 A1    Nov. 4, 2010

(30) Foreign Application Priority Data

Dec. 3, 2007   (GB) ................................. 0723613.6
May 19, 2008  (GB) ................................. 0809017.7

(51) Int. Cl.
*F01B 29/10*    (2006.01)
*F02G 1/04*     (2006.01)
(52) U.S. Cl.
USPC ............................................. 60/528; 60/527

(58) Field of Classification Search
USPC ............... 60/527–529; 373/101, 102, 137; 219/497, 499, 504, 505
See application file for complete search history.

(56) References Cited

U.S. PATENT DOCUMENTS 4,930,494 A    6/1990    Takehana et al.
4,977,886 A   12/1990    Takehana et al.
(Continued)

FOREIGN PATENT DOCUMENTS

EP    1 914 422 A1    4/2008
EP    2397826         12/2011
(Continued)

OTHER PUBLICATIONS

U.S. Appl. No. 12/740,488, filed Apr. 29, 2010.
(Continued)

*Primary Examiner* — Thomas Denion
*Assistant Examiner* — Brian Inacay
(74) *Attorney, Agent, or Firm* — Nixon & Vanderhye P.C.

(57) ABSTRACT

An SMA actuation arrangement comprises: an SMA actuator arranged on contraction caused by heating to drive movement of a movable element relative to a support structure; a current source operative to supply drive current through the SMA actuator to heat the SMA actuator; and a detector circuit operative to detect a measure of the resistance of the SMA actuator. While detecting a measure of the resistance of the SMA actuator and controlling the drive current on the basis of the measure of the resistance of the SMA actuator; there is derived a measure of an electrical characteristic of the SMA actuator that is representative of the ambient temperature. While applying closed-loop control an offset is added to the control signal which reduces the steady-state value of an error between the measure of the resistance of the SMA actuator and a target value. While applying open-loop control, the control signal is generated taking into account the electrical characteristics of the SMA actuator measured during a calibration stage.

30 Claims, 6 Drawing Sheets

(56) References Cited

U.S. PATENT DOCUMENTS

| | | | |
|---|---|---|---|
| 5,459,544 A | 10/1995 | Emura | |
| 5,685,149 A * | 11/1997 | Schneider et al. | 60/528 |
| 5,763,979 A | 6/1998 | Mukherjee et al. | |
| 5,900,995 A * | 5/1999 | Akada et al. | 359/824 |
| 6,459,855 B1 | 10/2002 | Kosaka et al. | |
| 6,516,146 B1 | 2/2003 | Kosaka | |
| 6,554,501 B2 | 4/2003 | Kosaka et al. | |
| 6,574,958 B1 | 6/2003 | MacGregor | |
| 6,945,045 B2 | 9/2005 | Hara et al. | |
| 7,561,202 B2 | 7/2009 | Goto | |
| 7,637,105 B2 * | 12/2009 | Sizer et al. | 60/528 |
| 2001/0002226 A1 | 5/2001 | Tanaka et al. | |
| 2001/0025477 A1 | 10/2001 | Hara et al. | |
| 2002/0001467 A1 | 1/2002 | Tanaka et al. | |
| 2002/0113499 A1 | 8/2002 | Von Behrens et al. | |
| 2005/0031140 A1 * | 2/2005 | Browning | 381/96 |
| 2005/0039453 A1 * | 2/2005 | Silverbrook | 60/527 |
| 2005/0217263 A1 * | 10/2005 | Cortona et al. | 60/527 |
| 2005/0275196 A1 | 12/2005 | Zanella et al. | |
| 2006/0048511 A1 | 3/2006 | Everson et al. | |
| 2006/0150627 A1 | 7/2006 | Oohara | |
| 2006/0209195 A1 | 9/2006 | Goto | |
| 2006/0266031 A1 | 11/2006 | Kosaka et al. | |
| 2007/0175213 A1 * | 8/2007 | Featherstone et al. | 60/527 |
| 2007/0252011 A1 | 11/2007 | Ferreira et al. | |
| 2008/0278030 A1 | 11/2008 | Hara et al. | |
| 2008/0278590 A1 | 11/2008 | Tanimura et al. | |
| 2009/0009656 A1 | 1/2009 | Honda et al. | |
| 2009/0086142 A1 | 4/2009 | Chen et al. | |
| 2009/0295986 A1 | 12/2009 | Topliss | |
| 2009/0301077 A1 * | 12/2009 | Takahashi | 60/528 |
| 2010/0060776 A1 | 3/2010 | Topliss | |
| 2010/0074607 A1 | 3/2010 | Topliss et al. | |
| 2010/0074608 A1 | 3/2010 | Topliss | |
| 2010/0257859 A1 | 10/2010 | Honda | |
| 2010/0283887 A1 | 11/2010 | Topliss | |
| 2010/0320943 A1 | 12/2010 | Honda | |
| 2011/0031924 A1 | 2/2011 | Honda | |
| 2011/0032628 A1 | 2/2011 | Tanimura et al. | |
| 2011/0164441 A1 | 7/2011 | Richardson | |

FOREIGN PATENT DOCUMENTS

| | | |
|---|---|---|
| JP | 2004-198503 | 7/2004 |
| JP | 2004-279324 | 10/2004 |
| JP | 2006-329146 | 12/2006 |
| JP | 2007-315352 | 12/2007 |
| WO | WO 2005/026539 A2 | 3/2005 |
| WO | WO 2005/075823 A1 | 8/2005 |
| WO | WO 2006/105588 A1 | 10/2006 |
| WO | WO 2007/113478 A1 | 10/2007 |
| WO | WO 2008/099155 | 8/2008 |
| WO | WO 2008/099156 | 8/2008 |
| WO | WO 2009/090958 A1 | 7/2009 |

OTHER PUBLICATIONS

International Search Report in PCT/GB2008/004015 mailed Oct. 26, 2009.

U.S. Appl. No. 13/126,401, filed Jul. 28, 2011, Gregory (equivalent to WO 2010/019689).

U.S. Appl. No. 13/129,520, filed Jun. 13, 2011, Topliss (equivalent to WO 2010/058177).

* cited by examiner

CONTROL OF A SHAPE MEMORY ALLOY ACTUATION APPARATUS

This application is the U.S. national phase of International Application No. PCT/GB2008/004015 filed 3 Dec. 2008, which designated the U.S. and claims priority to GB Application No. 0723613.6 filed 3 Dec. 2007; and GB Application No. 0809017.7 filed 19 May 2008, the entire contents of each of which are hereby incorporated by reference.

The present invention relates generally to control of an SMA (shape memory alloy) actuation arrangement that comprises an SMA actuator arranged on contraction caused by heating to drive movement of a movable element relative to a support structure.

The present invention has particular application to precision actuation of a relatively small movable element, for example a camera lens element, particularly a camera lens element of the type used in a miniature camera which may be employed in a portable electronic device such as a mobile telephone or a mobile digital data processing and/or transmitting device.

In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement.

Similar considerations apply to actuation arrangements for a wide range of other small objects.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electroactive devices.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a drive current through the SMA actuator to heat it causing the phase change. The phase change occurs over a range of temperature due to the statistical spread of transition temperature in the SMA crystal structure. The SMA actuator is arranged so that the contraction drives movement of the movable element.

The use of SMA material as an actuator for a small element such as the camera lens element of a miniature camera provides the advantages of being intrinsically linear, providing a high power per unit mass, being a low cost commodity item and being a relatively small component.

The present invention is concerned with the control of such an SMA actuation arrangement, and in particular with the need to provide for precision control of position. In general terms this is not straightforward due to the inherent physical properties of SMA material. Position is controlled by varying the temperature of the SMA material and the temperature may be controlled by supplying drive current through the SMA actuator. However, there is not a simple relationship between position and drive current. For example, the relationship between temperature and position is non-linear and also hysteretic, following different curves during heating and cooling. Furthermore, the relationship between the drive current and the temperature of the SMA actuator is complicated, this depending on the history of the heating and an the amount of cooling which is itself strongly dependent on the ambient temperature. As a result, in practice the control of the SMA actuator is complicated.

Although various different control techniques may be applied, since the actuator is thermally driven it can be appreciated that the control may require or benefit from knowledge of the ambient temperature of the actuator module. This has a substantial influence on the rate of heat loss from SMA actuator and on the power required to contract the SMA actuator. The heat loss will also affect cooling time during expansion, and will also affect rate of position creep of the actuator when holding position for an extended period. The first aspect of the present invention is concerned with determining the ambient temperature of an SMA actuation arrangement According to the first aspect of the present invention, there is provided a method of determining the ambient temperature of an SMA actuation arrangement comprising an SMA actuator arranged on contraction caused by heating to drive movement of a movable element relative to a support structure, the method comprising:

supplying drive current through the SMA actuator;

detecting a measure of the resistance of the SMA actuator, the drive current being controlled on the basis of the measure of the resistance of the SMA actuator;

deriving a measure of an electrical characteristic of the SMA actuator that is representative of ambient temperature.

Further according to the first aspect of the present invention, there is provided a control system for an SMA actuation arrangement implementing a corresponding method.

This aspect of the present invention is based on the appreciation that when the drive current is controlled on the basis of a measure of the resistance of the SMA actuator, various electrical characteristics of the SMA actuator are representative of ambient temperature. Thus a measure of such an electrical characteristic of the SMA actuator is derived as a measure representative of ambient temperature.

The measure of said electrical characteristic of the SMA actuator may be taken into account when controlling the drive current. This may be applied to many different control techniques for controlling the drive current, including closed-loop control and open-loop control. In closed-loop control, the power of the drive current supplied by the current source is controlled on the basis of an error between the measure of the resistance of the SMA actuator detected by the detector circuit and a target value for the resistance of the SMA actuator. In this case, the measure of said electrical characteristic of the SMA actuator may be used as the basis for an offset in the control loop as described further below. In open-loop control, the power of the drive current supplied by the current source is itself controlled to a target value. In this case, the measure of said electrical characteristic of the SMA actuator may be used to determine the target value needed for a given position which is highly dependent on ambient temperature.

A first possible measure of said electrical characteristic of the SMA actuator, applied when the drive current is applied initially to the SMA actuator in an unheated state to cause the resistance of the SMA actuator to rise to a local maximum resistance, is the difference between the resistance of the SMA actuator in the unheated state when the drive current is initially applied and the maximum resistance of the SMA actuator.

A second possible measure of said electrical characteristic of the SMA actuator is the power of the drive current required to hold the resistance of the SMA actuator at a predetermined level relative to the maximum resistance and/or minimum resistance of the SMA actuator.

The second aspect of the present invention is concerned with closed-loop control of an SMA actuation arrangement in which a measure of the resistance of the SMA actuator is used as the feedback signal. In this case, a closed-loop control signal for controlling the power of the drive current is generated on the basis of an error between the measure of the resistance of the SMA actuator detected by the detector circuit and a target value for the resistance of the SMA actuator. Use of resistance has significant advantages over use of a sensor to detect the actual physical position of the movable element, including accuracy and being straightforward and compact to implement, simply by providing additional electronic components supplementing the elements needed to provide the drive current which heats the SMA actuator.

However, it has been appreciated that such closed-loop control has the potential problem of experiencing a steady state error. If simple proportional control is applied to the control loop, there will be a steady-state error between the achieved stable resistance and the target resistance. As the gain is finite, there must be such an error to produce a drive current applying a power equal to the cooling losses (or conversely the absence of a resistance error implies no applied power, resulting in cooling, not a steady state).

Such a steady-state error can be reduced by increasing the gain, but there is a practical limitation that a high gain may cause resonance of the control loop and hence loss of control, lens oscillation, and significant overshoot on step movements. In view of this, in practice a relatively low gain is selected and so a significant steady-state error persists.

One theoretical possibility of reducing the steady-state error is to apply integral control to the control loop. However, this is difficult to apply in practice as the integrator must be very carefully tuned to the system. If the integration is too quick, it will increase the tendency of the system to overshoot, and may indeed cause self-sustaining oscillation away from the mechanical resonance of the system. If the integration is too slow, then it will take a very long time to settle resulting in drift during operation. In practice, this may make it desirable to avoid integral control or to apply integral control over a relatively narrow bandwidth which does not extend to DC such that the steady-state error persists.

According to a second aspect of the present invention, there is provided a method of controlling an SMA actuation arrangement comprising an SMA actuator arranged on contraction caused by heating to drive movement of a movable element relative to a support structure, the method comprising:

supplying drive current through the SMA actuator to heat the SMA actuator;

detecting a measure of the resistance of the SMA actuator, generating a closed-loop control signal for controlling the power of the drive current supplied by the current source on the basis of an error between the measure of the resistance of the SMA actuator detected by the detector circuit and a target value for the resistance of the SMA actuator, adding an offset to the control signal which reduces the steady-state value of said error, the power of the drive current supplied by the current source being controlled in accordance with the control signal having the offset added thereto.

Further according to the second aspect of the present invention, there is provided a control system for an SMA actuation arrangement implementing a corresponding method.

Thus the second aspect of the present invention reduces the problem of a steady-state error between the achieved stable resistance and the target resistance by adding an offset to the control signal supplied to the current source. Such an offset correspondingly offsets the power of the drive current, thereby allowing the steady-state error to be reduced, or even eliminated in the ideal case that the offset increases the power of the drive current by an amount equal to the cooling losses.

The offset may have a value which is dependent on a measure of the ambient temperature. This is advantageous because the steady-state error is dependent on the ambient temperature, because the steady-state error produces a drive current which provides a power equal to the cooling losses, i.e. the power required to hold the steady-state reduces with increasing ambient temperatures. Thus variation of the offset with ambient temperature allows the offset to better match the steady-state error over a range of operating ambient temperatures.

In general, any measure of ambient temperature could be used, but advantageously this is the power of the drive current required to hold the resistance of the SMA actuator at a predetermined level relative to the maximum resistance and/or minimum resistance of the SMA actuator. The SMA actuator has a property that resistance varies with length along a curve on which the resistance decreases from a local maximum resistance to a local minimum resistance during contraction. This measure of ambient temperature is closely related to the required offset because it is the power required to hold the steady state at the predetermined level of resistance. Accordingly, this measure of ambient temperature allows the power offset to be accurately calculated, with minimal extra calculations needed.

The offset may also have a value which is dependent on the degree of contraction of the SMA actuator and/or which is dependent on whether the SMA actuator is being heated or cooling. Although at the expense of increasing the required processing power, this provides added accuracy because the steady-state error and hence the required power offset varies over the displacement range with the varying temperature of the SMA actuator and varies between heating and cooling due to hysteresis.

Although such variation of the offset provides advantages, as an alternative the offset may have a fixed value, for example based on typical steady-state errors for manufactured SMA apparatuses. In this case, the steady-state error may still be reduced, although perhaps less precisely.

One possibility for providing precision control of an SMA actuator arrangement is to generate the control signal supplied to the current source supplying a drive current through the SMA actuator under closed-loop control on the basis of the measure of the resistance of the SMA actuator. Such closed-loop control allows accurate control of position because the resistance of the SMA actuator varies with the length of the SMA actuator in a predictable manner. Furthermore, use of resistance has significant advantages over use of a sensor to detect the actual physical position of the movable element, including accuracy and being straightforward and compact to implement, simply by providing additional electronic components supplementing the elements needed to provide the drive current which heats the SMA actuator.

However, such closed-loop control in practice limits the control to a part of the maximum range of movement available from contraction of the SMA actuator. In particular, SMA material has a property that as the SMA material contracts on heating, its resistance varies with length along a curve on which the resistance initially increases to a local maximum resistance, then decreases from that local maximum resistance to a local minimum resistance and then increases from that local minimum resistance. A region between the local maximum and minimum resistances is highly linear and as a result closed-loop using resistance feedback is typically applied in this region. However closed-loop control becomes impractical close to local maximum and minimum resistances because the position-resistance gain approaches infinity. In practice, therefore limits are set to the closed-loop region that are offset from the local maximum and minimum resistances. This limits the possible range of movement of the movable element in that some of the contraction of the SMA actuator beyond the local maximum and minimum resistance is not used to drive movement.

This limitation of the range of movement becomes more acute as the mechanical stress applied to the SMA actuator is increased. However, it is desirable to apply relatively high mechanical stresses to the SMA actuator to increase the upper limit of the temperature range at which the SMA actuator is operable, because the mechanical stress increases the phase transition temperature at which the phase change from the Martensite phase to the Austenite phase occurs. In other words, increasing the mechanical stress to increase the operating temperature range has the impact of limiting the available range of movement when closed-loop control is applied.

According to a third aspect of the present invention, there is provided a method of controlling an SMA actuation arrangement comprising an SMA actuator arranged on contraction caused by heating to drive movement of a movable element relative to a support structure, and a current source arranged to supply a drive current through the SMA actuator in accordance with a control signal supplied thereto, the method comprising:

supplying a control signal to the current source to provide a drive current selected to move the movable element to a predetermined position, the control signal being generated under open-loop control taking into account the electrical characteristics of the SMA actuator measured during a calibration stage, the calibration stage comprising supplying a control signal to the current source to vary the temperature of the SMA actuator whilst detecting a measure of the resistance of the SMA actuator, and simultaneously measuring the electrical characteristics of the SMA actuator. Further according to the third aspect of the present invention, there is provided a control system for an SMA actuation arrangement implementing a corresponding method.

The third aspect of the present invention applies open-loop control. In particular a control signal is generated under open-loop control to provide a drive current selected to move the movable element to a predetermined position. In general terms due to the complicated inherent physical properties of SMA material discussed above, this a priori may be considered difficult. However, it has been appreciated that such open-loop control is feasible by taking account of electrical characteristics of the SMA actuator measured during a calibration stage whilst detecting a measure of the resistance of the SMA actuator. This effectively allows the open-loop control to be scaled on the basis of the Measured electrical characteristics. As the electrical characteristics are measured whilst detecting resistance, optionally under closed-loop control, this allows the open-loop control to be adapted to variations in the ambient conditions and manufacturing tolerances, thereby allowing control with sufficient precision in open-loop conditions. The use of open-loop control in turn allows the range of movement to be extended to and beyond the local maximum and/or minimum resistances.

To allow better understanding, an embodiment of the present invention will now be described by way of non-limitative example with reference to the accompanying drawings, in which.

There will first be described the structure of a camera 1 incorporating an SMA actuation apparatus. The camera 1 is to be incorporated in a portable electronic device such as a mobile telephone, media player or portable digital assistant.

Figure 1:
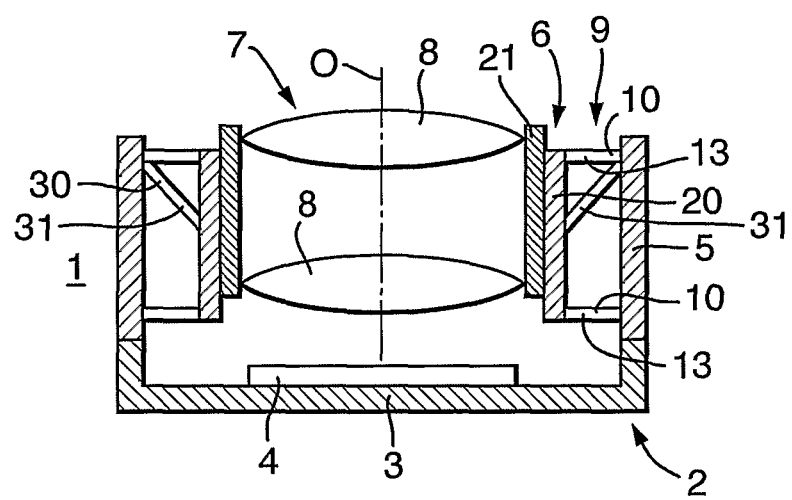
FIG. 1 is a schematic cross-sectional view of a camera incorporating an SMA actuation arrangement.

The camera 1 is shown schematically in FIG. 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The lens element 6 has a two-part construction comprising a lens carrier 20 and a lens holder 21 mounted inside the lens carrier 20 on an internal screw thread 22 formed inside the lens carrier 20. The camera 1 is a miniature camera with the lenses 8 of the lens system 7 typically having a diameter of at most 10 mm.

The lens element 6 is arranged with the optical axis O of the lens system 7 perpendicular to the image sensor 4. In this manner, the lens system 7 focuses light onto the image sensor 4.

The lens element 6 is suspended on the support structure 2 by a suspension system 9 consisting of two suspension elements 10 connected between the annular wall 5 of the support structure 2 and the lens element 6. Each suspension element 10 comprises flexures 13 which each are coupled at opposite ends to the lens element 6 and the annular wall 5 of the support structure 2.

The suspension system 9 guides movement of the lens element 6 along the optical axis O. Such movement of the lens element 6 changes the focus of the image formed on the image sensor 4.

The camera 1 comprises an SMA actuator 30 which comprises plural lengths of SMA wire 31. The SMA actuator 30 may be made of any suitable SMA material, for example Nitinol or another Titanium-alloy SMA material. SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the lengths of SMA wire 31 causes them to decrease in length.

The lengths of SMA wire 31 are connected in tension between the annular wall 5 of the support structure 2 and the lens element 6 at an angle to the optical axis O so that on contraction they apply a tensional force having a component along the optical axis O, in particular in a direction biasing the lens element 6 away from the image sensor 4. This is used to drive movement of the lens element 6 along the optical axis O as will now be described.

The force applied by the SMA actuator 30 deflects the flexures 13 of the suspension system 10 which thereby generate a biasing force in the opposite direction along the optical axis O. Thus, the suspension system 9 provides the function of acting as a passive biasing arrangement for the SMA actuator 30, as well as the function of suspending and guiding movement of the camera lens element 6.

In the unheated state of the SMA actuator 30, the lens element 6 is in its closest position to the image sensor 4 within its range of movement. The camera 1 is designed so that this position corresponds to far-field or hyperfocal focus, which is the most common setting for the camera 1, particularly if an auto-focus function is provided. On heating, the SMA actuator 30 drives movement of the lens element 6 away from the image sensor 4. The lens element 6 moves over a range of movement as the temperature of the SMA actuator 30 increases over the range of temperature in which the transition of the SMA material from the Martensite phase to the Austenite. The position of the lens element 6 relative to the support structure 2 along the optical axis O may be controlled by control of the temperature of the SMA actuator 30. In operation, heating of the SMA actuator 30 is provided by passing a current therethrough which provides resistive heating. Cooling is provided by ceasing the current and allowing the SMA actuator 30 to cool by conduction to its surroundings. The current is supplied by a control circuit 50 which is described further below.

The camera 1 may have the detailed construction of any of the cameras described and shown in WO-2007/113478; WO-2008/099156; or WO-2008/099155 which are incorporated herein by reference. As another alternative, the camera 1 may include a separate biasing element in addition to the suspension system, for example having the detailed construction described and shown in co-owned International Patent Application No. PCT/GB08/003,657 which is incorporated herein by reference. However, none of these detailed constructions are essential and in general the present invention may be applied to an SMA actuation apparatus for any kind of movable object requiring precision control, without limitation to cameras.

The nature of the control circuit 50 and the control effected thereby will now be described.

Figure 2:
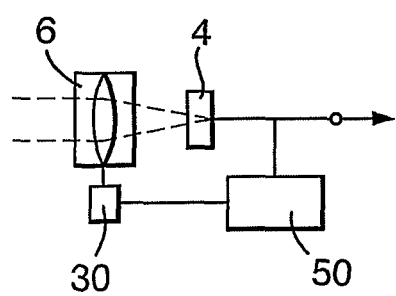
FIG. 2 is a schematic diagram of the overall control arrangement of the camera.

A schematic view of the overall control arrangement is shown in FIG. 2. The control circuit 50 is connected to the SMA actuator 30 and applies a current thereto to control the temperature of the SMA actuator 30 which moves the lens element 6 and changes the focus of the image formed on the image sensor 4. The output of the image sensor 4 is supplied to the control circuit 50 to be processed for determination of a measure of the quality of focus.

The control circuit 50 controls the degree of heating of the SMA actuator 30 by varying the power of the current flowing therethrough in response to the resistance of the SMA actuator 30 which is used as a measure of the position of the lens element 6. Other measures of position such as the temperature measured by a temperature sensor or a direct measure of the position of the lens element 6 output by a position sensor could be used, but a resistance sensor is advantageous because it does not increase the package size of the camera due to being implemented merely by additional components in the control circuit 50. The physical phenomena behind the use of resistance are as follows.

On heating of the SMA, there is an increase of resistivity with temperature as for most materials. This occurs inside and outside the range of temperature over which the phase-change occurs (the phase transition range) and hence over which the SMA contracts. However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Figure 3:
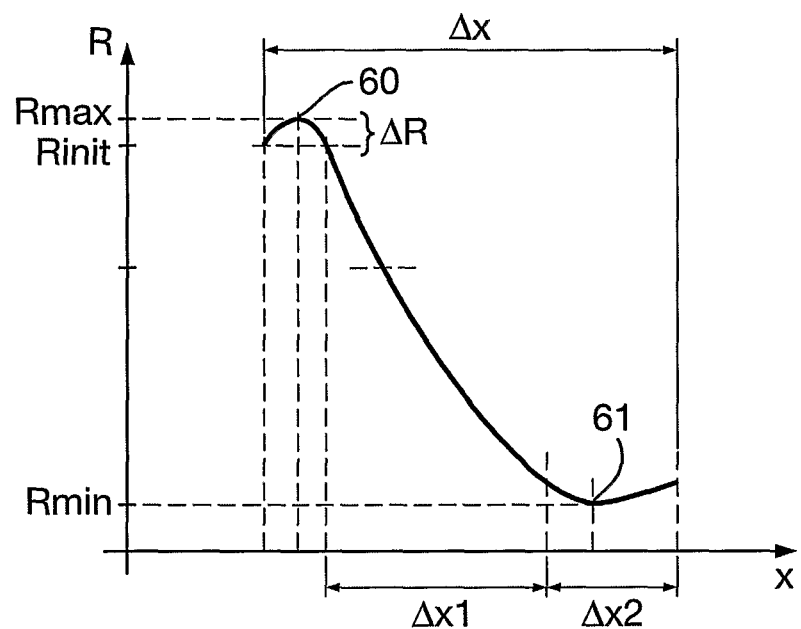
FIG. 3 is a graph of the resistance-length property of SMA during contraction.

Thus, SMA material has a property that resistance varies with length during heating and contraction along a curve of the form shown in FIG. 3 which is a graph of resistance of an SMA actuator against its length, corresponding to the position x of the lens element 6, the length increasing as the SMA material contracts corresponding to increasing temperature. Thus across the phase transition range, the lens element 6 moves across a positional range $\Delta x$ due to the contraction of the SMA. The resistance rises across a small initial part of the positional range $\Delta x$ to a local maximum 60 having a resistance value Rmax. The resistance falls across the major part of the positional range $\Delta x$ to a local minimum 61 having a resistance value Rmin, whereafter the resistance rises across a final part of the positional range $\Delta x$. Although the other factors affecting and increasing resistance make the overall relationship between temperature and resistance highly non-linear, the process of contraction and the associated reduction in resistance produce an almost linear dependence between resistance and position based on measurement over the greater part of the positional range $\Delta x$ between the local maximum 60 and the local minimum 61. Although the underlying physics is not entirely understood, the phenomenum is empirically observed and helps when applying closed-loop control as discussed below.

The control circuit 50 uses pulse-width modulation (PWM). In particular, the control circuit 50 applies a pulse-width modulated current pulses (which may be of constant current or constant voltage) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the SMA actuator 30 is low and so the SMA actuator 30 cools even though some current is being supplied. Conversely, when the duty cycle is at a high value in the range, the SMA actuator 30 heats. The resistance is measured during the current pulse, for example after a short, predetermined delay from the start of the pulse.

During heating of the SMA actuator 30 from a cool state below the phase transition range, the resistance varies with position in the manner shown in FIG. 3 in a manner which is consistent from sample to sample and in successive heating cycles. However, during cooling the resistance changes along a curve which is different but of similar form.

Figure 4:
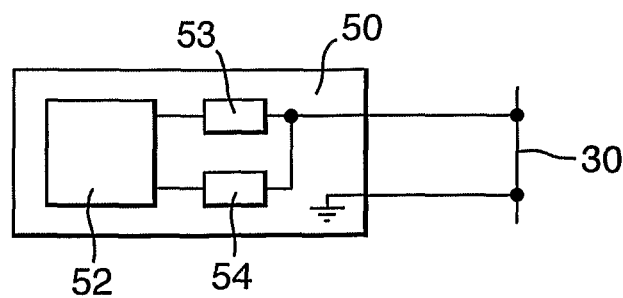
FIG. 4 is a diagram of the control circuit.

The control circuit 50 is shown in FIG. 4 and includes the following components.

The control circuit 50 includes a drive circuit 53 which is connected to supply current to the SMA actuator 30. The drive circuit 53 may be a constant-voltage current source or a constant-current current source. For example, in the latter case the constant current might be of the order of 120 mA.

The control circuit 50 further includes a detection circuit 54 arranged to detect the resistance of the SMA actuator 30.

In the case that the drive circuit 53 is a constant-current current source, the detection circuit 54 may be a voltage detection circuit operable to detect the voltage across the SMA actuator 30 which is a measure of the resistance of the SMA actuator 30.

In the case that the drive circuit 53 is a constant-voltage current source, the detection circuit 54 may be a current detection circuit.

For a higher degree of accuracy the detection circuit 54 may comprise a voltage detection circuit and a current detection circuit operable to detect the voltage and current across the SMA actuator and to derive a measure of resistance as the ratio thereof.

Figure 5:
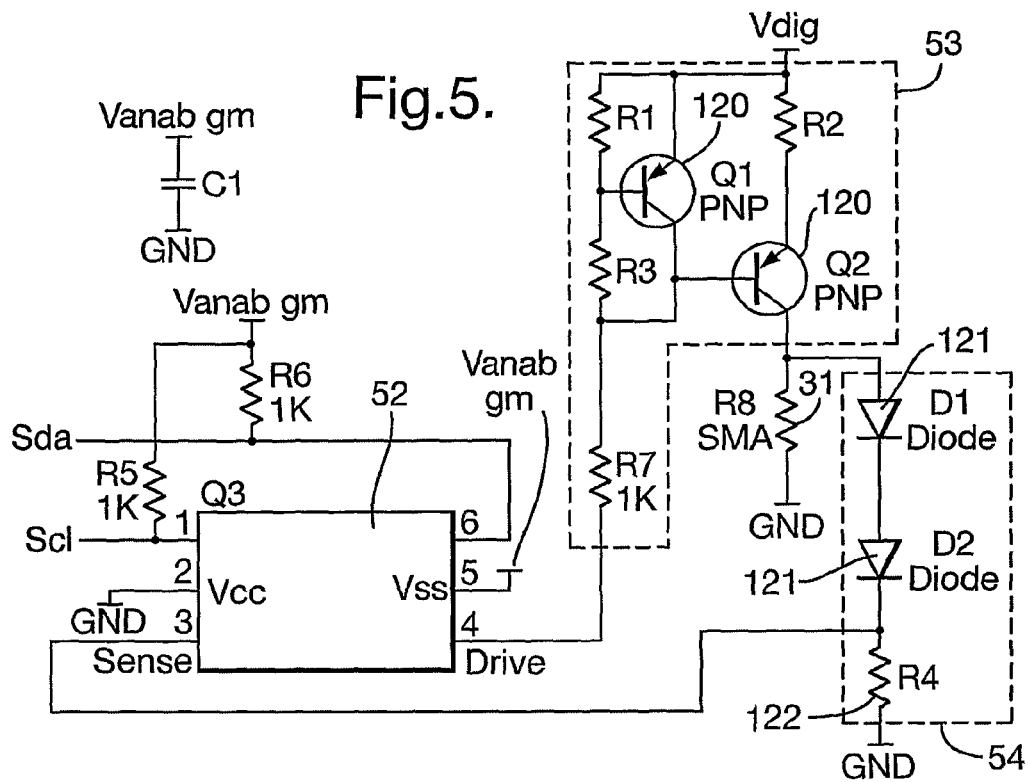
FIGS. 5 and 6 are diagrams of two possible circuit implementations for the control circuit.
Figure 6:
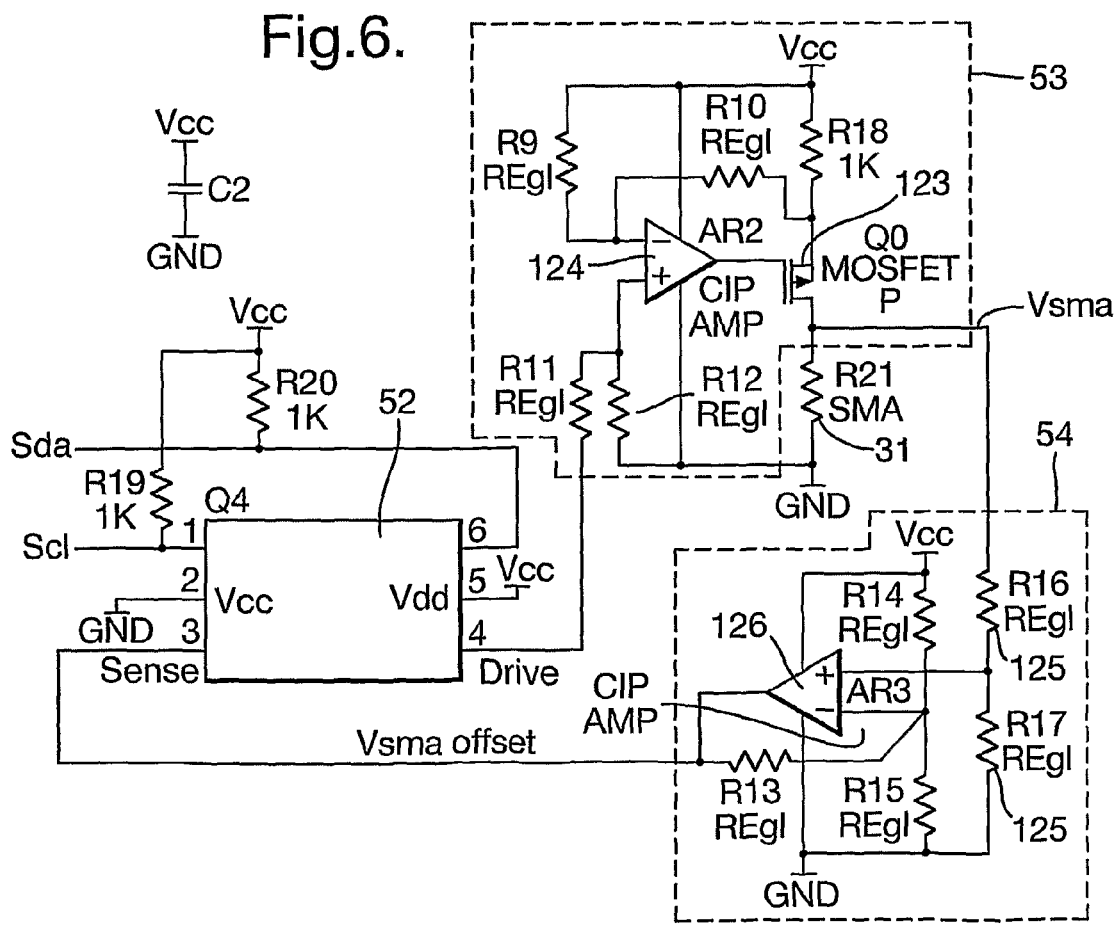

Two detailed circuit implementations for the control circuit 50 are shown in FIGS. 5 and 6.

The first circuit implementation of FIG. 5 is cheap but has limited performance. In particular, the drive circuit 53 is a constant-current current source implemented using a simple arrangement of bipolar transistors 120. The voltage detector circuit 54 is formed as a simple bridge arrangement of a pair of diodes 121 and a resistor 122.

The second circuit implementation of FIG. 6 is more accurate but is more expensive. In particular, the drive circuit 53 is a constant-current current source implemented by a MOSFET transistor 123 controlled by an operational amplifier 124. The detection circuit 125 is implemented by a bridge arrangement of two resistors 125, the output of which is amplified by an operational amplifier 126. The operational amplifier 126 allows the A/D convertor of the control unit 52 (described below) to make use of its full dynamic range.

The control circuit 50 further includes a control unit 52 which is operative to generate a control signal which is supplied to the drive circuit 53 to cause the drive circuit to supply a PWM drive current. The control unit 52 varies the power of the drive current by varying the duty cycle of the PWM drive current. The control unit 52 is implemented by a microprocessor running an appropriate program. The control unit 52 effects control based on the properties of the SMA material of the SMA actuator 50 as will now be described.

In general terms, the control unit 52 may provide closed-loop control or open-loop control.

Firstly, closed-loop control will be discussed. In closed-loop control, the control unit 52 receives the resistance measured by the detection circuit 54 and varies the power of the drive current in response thereto, using the measured resistance of the SMA actuator 30 as a feedback signal to drive the measured resistance to a target value for the resistance of the SMA actuator 30. In particular, the control unit 52 varies the power of the drive current based on an error between the measured resistance and the target value. The control unit 52 may implement a number of control algorithms to vary the power of the drive current. One possibility is proportional control in which the power is varied by an amount proportional to the difference between the detected resistance and the target resistance.

Figure 7:
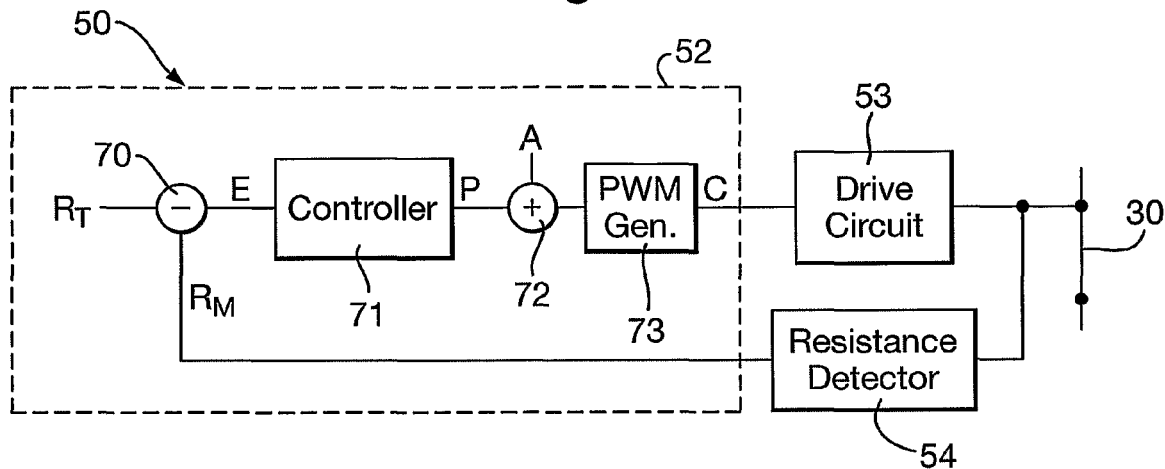
FIG. 7 is a schematic diagram of the closed-loop control implemented by the control unit of the control circuit.

FIG. 7 shows the control circuit 50 schematically illustrating the closed-loop control loop implemented in the control unit 52.

The closed-loop control drives the measured resistance $R_M$ of the SMA actuator 30 measured by the detection circuit 54 to a target value $R_T$. A subtractor 70 is supplied with the measured resistance $R_M$ and the target value $R_T$ and derives the error E therebetween which is supplied to a controller 71.

The controller 71 derives a power control signal P from the error E which is representative of the power to be supplied to the SMA actuator 30. The power control signal P is selected to drive the measured resistance $R_M$ to the target value $R_T$. To achieve this, the controller 71 may implement a number of closed-loop control algorithms to vary the power of the drive current. One possibility is proportional control in which the power is varied by an amount proportional to the error E. Other possibilities include proportional-integral and proportional-integral-derivative control, also taking into account the integral and/or derivative of the error E. If integral control is applied, the integrator must be very carefully tuned to the system. If the integration is too quick, it will increase the tendency of the system to overshoot, and may indeed cause self-sustaining oscillation away from the mechanical resonance of the system. If the integration is too slow, then it will take a very long time to settle resulting in drift during operation. In practice, this may make it desirable to avoid integral control or to apply integral control over a relatively narrow bandwidth which does not extend to DC.

The power control signal P is supplied to an adder 72 which adds an offset A to the power control signal P. The offset A is selected to reduce the steady-state value of the error E, as discussed further below. The output of the adder 72 is supplied to a PWM generator 73 which generates a PWM control signal C which is PWM-modulated in accordance with the value of the power control signal P having the offset A added thereto. The PWM control signal C is supplied to the drive circuit 53 which supplies the drive current to the SMA actuator 30 in accordance therewith.

The offset A reduces the steady-state value of the error E which would otherwise exist. Using proportional control, as the gain of the closed-loop control loop is finite, such an error is present to produce a drive current applying a power equal to the cooling losses. Such a steady-state error can be reduced by increasing the gain, but there is a practical limitation that a high gain may cause resonance of the control loop and hence loss of control, oscillation, and significant overshoot on step movements. In view of this, in practice a relatively low gain is selected and so a significant steady-state error persists. The offset A is selected to offset the power of the drive current, thereby allowing the steady-state error to be reduced, or even eliminated in the ideal case that the offset increases the power of the drive current by an amount equal to the cooling losses.

The offset A is selected by the control unit 52.

The offset A may have a fixed value, for example based on typical steady-state errors for manufactured SMA apparatuses. For greater precision, the offset A may have a value which is varied dependant on any of the following parameters.

The offset A may have a value which is dependent on a measure of the ambient temperature. This is advantageous because the steady-state error is dependent on the ambient temperature, because the steady-state error produces a drive current which provides a power equal to the cooling losses, i.e. the power required to hold the steady-state reduces with increasing ambient temperatures. Thus variation of the offset with ambient temperature allows the offset to better match the steady-state error over a range of operating ambient temperatures. The measure of the ambient temperature may be derived from a temperature sensor, or may be derived from an electrical characteristic of the SMA actuator 30 during operation, as described further below, for example the power of the drive current required to hold the resistance of the SMA actuator 30 at a predetermined level relative to the local maximum and/or minimum resistance of the SMA actuator 30. This measure of ambient temperature is closely related to the required offset because it is the power required to hold the steady state at the predetermined level of resistance. Accordingly, this measure of ambient temperature allows the power offset to be accurately calculated, with minimal extra calculations needed.

The offset A may have a value which is dependent on the degree of contraction of the SMA actuator 30 and/or which is dependent on whether the SMA actuator 30 is being heated or is cooling. Although at the expense of increasing the required processing power, this provides added accuracy because the steady-state error and hence the required power offset varies over the displacement range with the varying temperature of the SMA actuator and varies between heating and cooling due to hysteresis.

Closed-loop control based on a measure of resistance allows for accurate control of position. The stability of the feedback control is maintained by the inherent proportional-integral action of the SMA actuator 30 itself during heating. The overall feedback response is dominated by the response of the whole of the heating of the SMA actuator 30. Clearly, the electrical power required to drive the SMA actuator 30 through its phase transition temperature, and hold a proportional position, is highly dependent on the ambient temperature. However, use of resistance as a feedback parameter in closed-loop control combats both the temperature hysteresis of the phase change, the temperature range of the phase transition, and the high dependence on ambient temperature.

Such closed-loop control may be used to drive movement of the movable element 6 across a range between the local maximum 60 having a resistance value Rmax and the local minimum 61 resistance having a resistance value Rmin where the curve is highly linear. However closed-loop control becomes impractical close to local maximum and minimum resistances because the position-resistance gain approaches infinity. In practice, therefore limits are set to the closed-loop region that are offset from the local maximum and minimum resistances. For example in an initial calibration stage, the SMA actuator 30 is heated and during the heating the local maximum 60 and local minimum 61 are detected and the resistances Rmax and Rmin thereof are detected and stored. Thereafter in closed-loop operation, the resistance is varied between an upper limit a predetermined decrement below the resistance Rmax and a lower limit a predetermined increment above the resistance Rmin. Other examples of control algorithms which may be applied are disclosed in WO-2007/113478; WO-2008/099156; and WO-2008/099155. However, such an approach does not use the full positional range Δx because some of the contraction of the SMA actuator 30 near and beyond the local maximum and minimum resistance is not reached. Thus the range of movement is limited.

This limitation of the range of movement becomes more acute as the mechanical stress applied to the SMA actuator is increased, this being desirable to increase the upper limit of the temperature range at which the SMA actuator is operable. In general, the reversible phase change of SMA material occurs over a temperature range that is dependent on the mechanical stresses therein, but might typically be between 10° C. and 60° C. There is also temperature hysteresis, where the phase change from Martensite to Austenite on heating typically occurs at a temperature approximately 10° C. to 30° C. hotter than the phase change from Austenite to Martensite on cooling (again dependent on the mechanical stresses). The electro-mechanical coupling of the SMA material accounts for the temperature dependence on the mechanical stresses. If the stress is increased, the phase transition temperatures also increase. Thus to allow operation at higher temperatures, it is necessary to increase the phase transition temperatures by operating at higher stresses, much closer to the stress limits of the chosen material. However, increasing the mechanical stress applied to the SMA actuator 30 increases the limitation of the range of movement discussed above. In particular, there is more possible movement which could be achieved, particularly beyond the local minimum 61.

Open-loop control has the benefit of allowing movement outside the limited range of movement achievable by closed-loop control, and will now be discussed in detail.

In open-loop control, the control unit 52 varies the power of the drive current to drive the SMA actuator 30 to a desired position without reference to the measured resistance of the SMA actuator 30. In effect this means that the SMA actuator 30 is controlled based on calculating the required power application profile. The required power is based on a model or models of the SMA actuator 30, to move from position to position with appropriate accuracy and speed of response. Models of various complexity may be used depending on the positional accuracy, repeatability, and linearity required from the system as a whole. As described in detail below, the control unit 52 uses an SMA model that relates the temperature of the SMA actuator 30 to the position of the movable element 6 and a thermal model that relates the power of the drive current to the temperature of the SMA actuator.

A problem with using such open-loop models is the high degree of variation, for example with ambient temperature and with the individual camera 1 due to manufacturing tolerances and aging processes. The control unit 52 deals with this problem by measuring electrical characteristics of the SMA actuator 30 whilst operating under closed-loop control and then taking such electrical characteristics into account when subsequently operating under open-loop control. Due to the inherent accuracy of closed-loop control, this approach allows the parameters of the open-loop control to be accurately determined and set, effectively allowing the open-loop control to take advantage of the accuracy of the closed-loop control.

Figure 8:
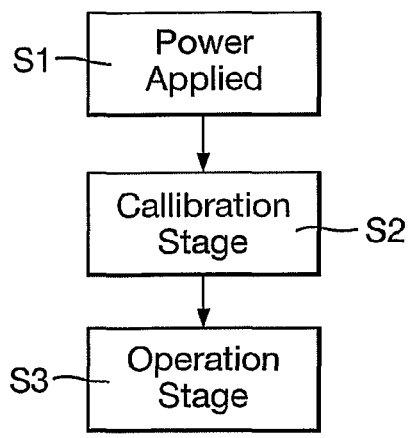
FIG. 8 is a flow chart of the overall operation of the control unit when applying open-loop control.

By way of example, FIG. 8 illustrates the operation of the control unit 52 which may be applied to achieve this.

The operation starts when power is applied (step S1). Thereafter, in a calibration stage (step S2) the control unit 52 generates control signals for supply to the SMA actuator 30 to vary the temperature of the SMA actuator 30 to cause contraction thereof. This may be performed under closed-loop control as described above. However this is not essential as the control signals may instead simply increase the power of the drive current over time in open-loop. In the calibration stage (step S2), the SMA actuator 30 is heated over the positional range Δx and electrical characteristics of the SMA actuator 30 are detected and stored.

Subsequently, in an operation stage (step S3), the control unit 52 generates control signals for supply to the SMA actuator 30 under open-loop control, as described below. The electrical characteristics measured during the calibration stage (step S2) may be updated during the operation stage (step 3).

Depending on the open-loop model used, various electrical characteristics may be used, such as values of resistance at predetermined levels with respect to the local maximum resistance and/or the local minimum resistance, or values of the power of the drive current required to hold the resistance at predetermined levels with respect to the local maximum resistance and/or the local minimum resistance. Particular examples are described further below.

One key factor is ambient temperature, because the power required to achieve a given position is highly dependent on the ambient temperature. Therefore the measured electrical characteristics may include an electrical characteristic of the SMA actuator that is representative of ambient temperature. Various such electrical characteristics may be used.

A first-possible electrical characteristic of the SMA actuator 30 that is representative of ambient temperature is the difference AR between the resistance Rinit of the SMA actuator 30 in the unheated state when the drive current is initially applied and the resistance value Rmax of the local maximum 60, as shown in FIG. 3. This is measured in the calibration stage (step S2) when the drive current is applied initially to the SMA actuator 30 in an unheated state to cause the resistance of the SMA actuator 30 to rise to the local maximum 60.

This measure may be understood from the fact that the temperature of the SMA actuator 30 that corresponds to the local maximum 60 is sufficiently invariant with different manufactured apparatuses and over typical ambient temperature ranges to form a useful benchmark. In contrast, the resistance Rinit of the SMA actuator 30 when the drive current is applied initially to, the SMA actuator 30 in an unheated state is much more dependent on the ambient temperature. Whilst little useful information can be reliably determined from the absolute value of the resistance Rinit of the SMA actuator 30 in the unheated state when the drive current is initially applied, the difference AR between this resistance Rinit and the resistance Rmax of the local maximum 60 correlates well to ambient temperature. In general terms, for decreasing ambient temperatures, the initial resistance Rinit will decrease and so the difference AR will increase.

To put this in concrete terms, like many metals, the resistivity of SMA material changes by approximately +0.1% per ° C. in the absence of any phase change. By way of example, for a given construction in which the SMA actuator 30 has a resistance Rinit in the unheated state of, say, 27Ω, the resistance therefore changes by around 27 mΩ per ° C. Phase transition occurs sufficiently to cause the SMA actuator 30 to reach the local maximum 60 when the temperature of the SMA actuator 30 reaches, say, 80° C. (regardless of ambient temperature). The position-resistance gradient will be very low by this point (because phase transition does not happen instantaneously), therefore the reference temperature may need to be determined empirically. In this case if Rinit is measured at 26.5Ω, Rmax is measured at 27.9Ω, then ambient temperature is around 28° C. This type of calculation will normally yield an accuracy of around ±10° C., which is sufficient for many purposes.

This measure of ambient temperature has the advantage that it is not particularly dependent on the geometry of the SMA actuator 30 of a particular camera 1. Although the absolute values of the resistances will be dependent on the geometry of the SMA actuator 30, for example the diameter in the case of SMA wire 31, as the main source of variation between different manufactured cameras 1, the difference has a much lesser dependance.

To make the measure less variable still, it is possible to derive the measure as the difference divided by a characteristic resistance of the SMA actuator, for example the resistance Rmax of the local maximum 60, the resistance Rmin of the local minimum 61 or a linear combination thereof. This makes the measure dimensionless and further reduces dependence on geometry. Therefore this measure provides the best absolute estimate of the ambient temperature.

A second possible electrical characteristic of the SMA actuator 30 that is representative of ambient temperature is the power of the drive current required to hold the resistance of the SMA actuator at a predetermined level relative to the resistance Rmax of the local maximum 60 and/or resistance Rmin of the local minimum 61 of the SMA actuator 30. For example, this may be the power required to hold the resistance at the mid-point between the resistance Rmax of the local maximum 60 and resistance Rmin of the local minimum 61. Such use of the mid-point is robust as the temperature is better defined because the phase change is very sensitive to temperature away from the limits of the phase change.

This second measure uses the fact that the steady state power required to maintain the resistance of the SMA actuator 30 at a given value is highly dependent on the ambient temperature, because the heat losses from SMA actuator 30 are themselves dependent on ambient temperature. Thus the measured steady state power therefore correlates well with ambient temperature.

The resistance of the SMA actuator 30 and hence the measured power does have some dependence on the geometry of the SMA actuator 30 and surrounding components of the camera 1, and so the second measure will vary between different manufactured cameras 1 and is less good as an absolute measure of ambient temperature than the first measure. However, the second measure is particularly useful for some applications when the control of the drive current needs to utilise a power measurement, for example to derive the offset A described above.

Figure 9:
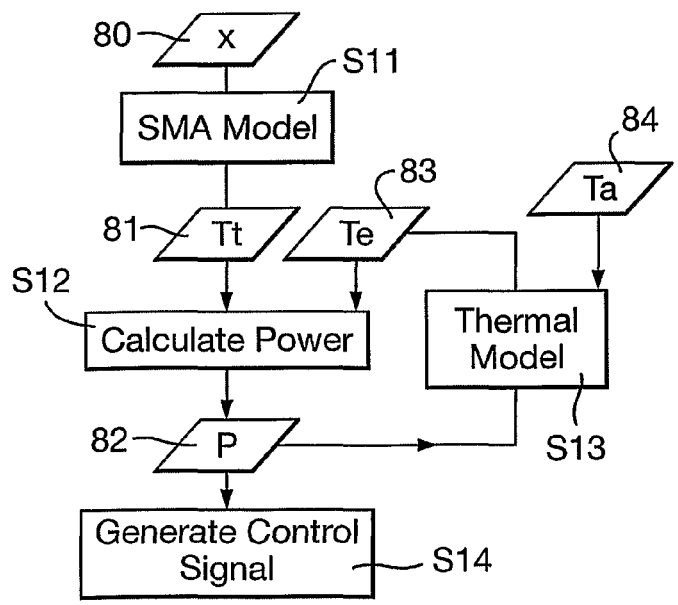
FIG. 9 is a flow chart of the open-loop control implemented by the control unit.

FIG. 9 is a flow chart of the open-loop control implemented in the control unit 52 which will now be described.

In open-loop control, the control unit 52 receives the position x as input data 80 and derives the power P of the drive current to be supplied to the actuator as data 82. To achieve this the control unit 52 performs the following operations.

In step S11, a target temperature Tt as data 81 is derived from the position x using an SMA model that relates the temperature of the SMA actuator 30 to the position of the movable element 6.

In steps S12 and S13, the power P of the drive current is derived from the target temperature Tt using a thermal model that relates the power of the drive current to the temperature of the SMA actuator 30, as follows.

In step S12, the power P of the drive current is derived from the target temperature Tt and an estimate Te of the instantaneous value of the temperature of the SMA actuator 30 being data 83. This power P may be proportional to the error between the target temperature Tt and the estimate Te. In this case P=G(Tt−Te) where G is the is the proportional gain of the open-loop control being an empirically tuned value (typically providing the best dynamic response without exciting resonances) which is normally set relatively high to ensure good dynamic response and low steady-state error. By way of example in one specific construction of the camera 1 this gain G is set to 13 mW/° C.

Simultaneously with step S12, in step S13, the estimate Te of the instantaneous value of the temperature of the SMA actuator 30 is derived from the calculated power P of the drive current using a thermal model that relates the power of the drive current to the temperature of the SMA actuator 30. The thermal model takes account of the ambient temperature Ta of the camera 1 as data 84, which may be derived as described above, and maintains an estimate Te of the instantaneous value of the temperature of the SMA actuator 30.

Thus the control unit 52 makes use of a virtual variable between input position x and the output power P, namely the temperature Te of the SMA actuator. This is not necessary but has advantages in terms of code complexity and model characterisation. In effect, when power is applied to the SMA actuator 30, the control unit 52 keeps track of the estimated temperature Te of the SMA actuator. This is intuitively useful because in reality it is the temperature of the SMA actuator 30 (and its temperature history) that determines the relative proportions of the Martensite and Austenite phases and hence the position of the SMA actuator 30. However, there is no specific temperature sensor in the system, so changes in temperature are calculated.

In step S14, there is generated from the power P a PWM control signal which is PWM-modulated in accordance with the power P.

The SMA model used in step S11 will now be described.

Figure 10:
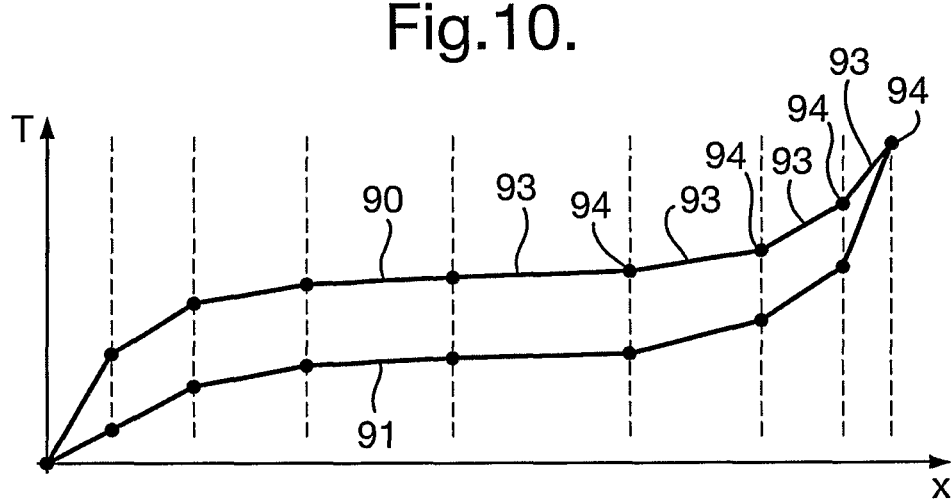
FIG. 10 is a graph of curves represented by parameters of an SMA model.

The SMA model comprises parameters that represent a curve or curves relating the temperature of the SMA actuator 30 to the position of the movable element 6. An example is shown in FIG. 10 which is a graph of two suitable curves 90, 91 of temperature T against position x represented by the parameters. The first curve 90 representing the relationship during heating and the second curve 91 representing the relationship during cooling. Typically, the first curve 90 is at higher temperatures than the second curve 91 and in the central region of interest, which corresponds to the majority of the phase change and contraction, there is approximately a constant temperature hysteresis between the two curves 90, 91.

To minimise the amount of data required to store the parameters and to simplify their use, the parameters represent each curve 90, 91 as a series of plural linear segments 93, in particular eight segments 93 in this example. There are many possibilities for defining and storing parameters representing the curves 90, 91. One option is to store temperature values of each line segment node 94 and then also store the gradients of each segment 93, requiring storage of thirty-two parameters in this particular example. An alternative is to assume the position that each node 94 corresponds to a predetermined change in temperature T as shown by the dotted lines in FIG. 10 (or a predetermined change in position x), in which case only the gradients need to be stored, requiring storage of sixteen parameters in this particular example.

In step 11, the control unit 52 simply derives the target temperature T corresponding to the position x on the curves 90, 91.

Separate curves 90 and 91 are provided in respect of heating or cooling of the SMA actuator 30 to take account of hysteresis. The appropriate curve 90 or 91 is selected in step S11 on the basis of whether the temperature of the SMA actuator 30 is being increased or decreased, that is by comparing the target temperature Tt and the estimate Te of the instantaneous value of the temperature of the SMA actuator 30.

Various different approaches of differing complexity and accuracy may be applied in step S11 when there is a change between heating and cooling of the SMA actuator 30 requiring switching between the curves away from the ends of travel, this is when moving around minor hysteresis loops. One simple approach is to assume that movement only occurs in the heating direction when on the curve 90 and in the cooling direction when on the curve 91, in which case it is assumed that no movement (change in position x) occurs for changes in temperature between these two curves 90, 91.

In other words when the direction of movement is changed, there is a transition from one curve 90 (or 91) to the other curve 91 (or 90) without change in position, i.e. moving vertically between the curves 90 and 91.

A somewhat more complex but in principle more accurate algorithm is to scale the curves 90 or 91 based on the position x when the movement direction is changed, and then to follow the scaled curve. All scalings of the curve 91 in respect of cooling assume that the infinity position and temperature T are fixed (the origin of the SMA model). Likewise, all scalings of the curve 90 in respect of heating assume that the macro position and temperature T are fixed. Practically, it is found the main hysteresis errors on heating and cooling are actually associated with errors in the thermal model described below, rather than errors in dealing with the hysteresis in the SMA model. In effect this means that for very slow heating and cooling cycles, the SMA model is very successful in removing hysteresis. However, for faster cycles the hysteresis can be present again, owing to the errors in estimating temperature. For faster cycles, the model is more prone to errors in the estimates of the time constants. On this basis, it is found experimentally that the first simple model of hysteresis, where it is assumed that movement only occurs on the major heating and cooling curves, is adequate, ie that minor loops can be ignored.

The parameters of the SMA model may have fixed values which are typical of the design of the camera 1 or are measured during manufacture and stored in the control unit 52 and may be determined through experimentation and characterisation.

As an alternative the SMA model may be adjusted and scaled along both the temperature axis and the position axis based on electrical characteristics measured during the calibration stage (step 2).

One basic way in which this can be achieved is by making use of the limits of the linear resistance region near the local maximum 60 and local minimum 61. Along both the temperature axis and the position axis, these limits are assumed to occur at the same proportions along the curves for all actuator modules. Therefore, in principle, if the temperature and position co-ordinates are known for both limits of the linear resistance region (near the resistance maximum and minimum) for both the heating and cooling curves, these can be used to scale the SMA model in both axes. These correspond to four points in the temperature versus position space, which are used to scale the SMA model. Therefore, one of the key functions of the calibration stage (step 2) is to measure sufficient equivalent information to allow this scaling.

This philosophy means that there is the option for the SMA model to be coded directly into the algorithm, avoiding using up RAM space in the simple drive processor used for the drive and control electronics. The scale factors that transform the basic model would then be all that need be stored in RAM after calibration, but there are fewer of these parameters.

In practice, temperature and position measurements cannot be measured directly. What can be measured is resistance in the closed-loop region and the steady state power to maintain the resistance. Various algorithms can then be used to correlate the resistance and power measurements with the appropriate temperature and position co-ordinates.

The thermal model described below provides the best method for translating the measured power to hold a resistance into the estimate of the temperature of the SMA actuator 30. Therefore translating the power measurements to temperature co-ordinates is straightforward.

Scaling the position axis is more challenging. The need to scale in the position axis is less clear cut, as inherently the 'gain' that relates a change in position to a change in resistance is very similar across different cameras 1. However, adjustments to this gain are desirable to improve accuracy. The errors to the 'constant resistance-position gain' assumption are primarily associated with variations in the SMA actuator 30 resistivity and diameter.

Rather than assuming the resistance versus position gain is constant, an improvement is to make use of the steady state power measurements taken at two points in the linear resistance region. The difference in power between them essentially correlates with the thermal mass of the SMA actuator 30. This in turn largely corresponds the SMA actuator 30 diameter. A larger difference in power between the resistances implies a larger diameter actuator 30, or a higher resistivity. Either way, this information can be used to adjust the resistance versus position gain.

An alternative adjustment algorithm is to consider the change in resistance in moving from the limit of the linear resistance region near the local maximum 60 and the local minimum 61 as a percentage of the resistance Rmax at the local maximum 60. This is similar to the definition of mechanical strain, except 'resistance' and 'change in resistance' replace 'length' and 'change in length'. Therefore, this measure correlates to the change in strain of the SMA actuator 30 and hence is a measure of the change in position, which can be used to adjust the resistance versus position gain for specific actuator modules. Resistances other than those at the limits may also be used.

Therefore, these algorithms allow the power and resistance measurements taken to be used to scale the temperature versus position characteristic.

In terms of the specific resistance and power measurements taken as part of the algorithm to scale the SMA model, there are three practical difficulties in measuring the limits to the closed-loop resistance region on the heating and cooling curves as described for the basic approach above.

The first difficulty is measuring the limit near the local minimum 61 on cooling. It is difficult to find this position on cooling and measure the holding power. This is because the SMA actuator 30 is cooling down through the local minimum 61, and since this minimum is shallow, the algorithm can typically only detect the limit after it had cooled past it, making the power measurement invalid.

The second difficulty is associated with the measurements at the limit near the local maximum 60. The local maximum 60 occurs when the mechanism is still on the mechanical end-stop. When on the end-stop, the stress in the SMA actuator 30 is indeterminate, and hence so are the transition temperatures. Therefore the SMA model is not valid when on the end-stop (neither in temperature nor position). Therefore, resistance and power measurements taken when on the end-stop are not appropriately valid for scaling the temperature-position model. Therefore, it is dangerous to use the limit near the local maximum 60 for scaling the temperature-position model.

The third difficulty is associated with the time for the calibration stage (step 2). The calibration stage (step 2) can be happening whilst the image sensor boots up. If the calibration stage (step 2) takes less time than the image sensor boot up, it does not limit performance. However, longer calibration stage (step 2) times will limit performance. Each time a measurement is done to assess the steady state power to maintain a resistance, this takes time, as the system needs to stabilise. As a guide, it is a challenge to measure the steady state resistance in less than 50 ms, although this may be possible by assuming a settle characteristic, possibly adjusting this estimate based on ambient temperature. In contrast, the image sensor boot up time is of the order of 200 ms, although this varies from sensor to sensor. Therefore, it is desirable to limit the number of reference points to scale the temperature-position model to three, as this is the minimum required to scale the heating curve, and then scale the cooling curve from the heating curve.

On the basis of these three difficulties, the compromise to take measurements at the centre of the linear region, halfway between the local maximum 60 and the local minimum 61, on both the heating and cooling curves, and then also take measurements at the limit of the linear resistance region near the local minimum 61 on the heating curve. Finding these centre resistances still requires calculating the difference between the maximum resistance Rmax and minimum resistances Rmin, and so still use of the maximum resistance. However, the absolute value of the maximum resistance Rmax is less dependent on the transition temperatures, and so the value of the resistance in the middle of the linear resistance region is less prone to error.

A typical example of the SMA model is as follows.

For each segment 93, a relative gradient (μm movement per ° C.) is assigned. Two segments 93 are selected to represent the region between Rmin and Rmid-heat. By symmetry, this means that roughly four segments 93 are used to represent portion of the response that can be controlled closed-loop, two segments 93 to represent the area below Rmax and two segments 93 to represent the area above Rmin. Assuming all segments 93 cover the same change in temperature (eg 12° C. for a nominal device), in a typical model, the eight segments 93 have the following gains (° C./μm): 0.8625, 0.575, 0.4313, 0.23, 0.115, 0.23, 0.4313, 0.575. This means that the following displacements are available from each segment 93 (μm): 14, 21, 28, 52, 104, 52, 28, 21. The SMA model is referenced to Rmid on heating and cooling. In our case, the centre of the zone containing 104 μm stroke is assumed to correspond to Rmid. Using different reference temperatures on heating and cooling gives a zeroth order compensation for hysteresis Calculating the target model temperature is fairly simple given the above basis.

For example, if the request is to move to 100 μm displacement from 60 μm (i.e. heating direction). This implies that the target point occurs 71% of the way through the 4th segment 93 (the total displacement available from the first three zones is 14+21+28=63 μm. This means that there is 37 μm to gain from the zone with 52 μm available. The reference point (TRmid-heat) is 50% of the way through segment 5. Therefore, the target point is 79% of one zone size away from the reference point. Imagine that we measured TRmin at 110° C. and TRmid-heat at 90° C. (i.e. a temperature difference of 20° C., compared with a nominal of 24° C., giving us 10° C. per segment, rather than the 12° C. nominal). This implies that we would set the model target temperature to 82.1° C. (90° C. minus 79% of 10° C.).

If the request is to move to 100 µm from 140 µm (i.e. cooling direction). The first stage of calculation would proceed in exactly the same way. If we had again measured TRmin at 110° C., TRmid-heat at 90° C. and TRmin-cool at 80° C., then we would use the cooling reference and set the target temperature to 72.1° C. (80° C. minus 79% of 10° C.). As commented before, this of itself is a zeroth order compensation for hysteresis.

The default model describes 320 µm of movement. If a request is produced to heat to a displacement of 350 µm, then extrapolation is used from the last described position. That is, the first 7 segments produce describe a movement of 299 µm, therefore the request is to extract 51 µm from the final segment. The final segment has a nominal gain of 0.575° C./µm. This needs to be scaled by the characteristic gain of the particular actuator—assuming the same measurements as above, the gain of the final segment becomes 0.479° C./µm (0.575° C.×10° C./12° C.). This implies that we need to set the demand to 24.4° C. past the boundary of the final segment. This is 244% of the zone size. Again the reference point is 50% of the way through segment 5, therefore the target point is 494% of one zone above the reference point. This gives us a target model temperature of 139.4° C. (90° C. plus 494% of 10° C.).

Of course, this type of extrapolation should not be applied indefinitely. Normally a hard upper limit of 180° C. is imposed on extrapolated temperature demand.

The thermal model used in step S13 of FIG. 9 will be described.

In step S13 the estimated value Te of the instantaneous temperature of the SMA actuator 30 is updated in accordance with the following equation which represents the thermal model:

$$dTe/dt=k1.(P-k2.(Te-Tenv))$$

where: Te is the estimated value of the instantaneous temperature of the SMA actuator 30; t is time; P is the power of the drive current; Tenv is the assumed temperature of the environment around the SMA actuator 30; k1 is a constant that represents the inverse of the thermal capacity of the SMA material (ie a material property); k2 is a constant that represents the heat losses from the SMA to the environment (ie a property of the geometry). This equation represents the physical phenomenon that the rate of change of temperature of the SMA actuator 30 is proportional to applied power and also proportional to the heat losses to the environment, which is determined by the temperature difference between the SMA actuator 30 and the environment. This differential equation model is used to keep track of the estimated SMA actuator 30 temperature as electrical power is applied.

In a simple embodiment, the assumed temperature Tenv of the environment around the SMA actuator 30 is taken to be the ambient temperature Ta derived as described above, whereby the thermal model takes account of the ambient temperature Ta.

There will now be discussed creep compensation provided by a further refinement that improves accuracy and performance and requires an alteration to this thermal model.

One phenomenon that occurs is that as power is applied to the SMA actuator 30, over time the environment around the SMA actuator 30 heats up; specifically the air and the surrounding components of the camera 1. The ends of the SMA actuator 30 in contact with other components of the camera 1 are cooler than the middle length of the SMA actuator 30 as heat is conducted away along the length of the SMA actuator 30 into the components of the camera 1. Therefore the active part of the SMA actuator 30 that participates in the movement of the mechanism is less than the total free length. However, over time as the environment heats up, the proportion of active actuator 30 also increases as heat losses reduce. This has the effect that for a given temperature of the SMA actuator 30 when the movable element is lifted away from the mechanical end-stop, the position corresponding to that temperature moves further from the end-stop over time and more SMA actuator 30 becomes active and contracts.

In addition, the act of using and heating the SMA actuator 30 will heat up the environment around the SMA actuator 30, and indeed over time more of the SMA actuator 30 near the SMA mounting points will become active as thermal losses from these regions consequently reduce. This affects the heat losses from the SMA actuator 30. The heating up of the environment is governed by at least one time constant, which is considerably longer than the time constant for heat up the SMA actuator 30 itself.

Figure 11:
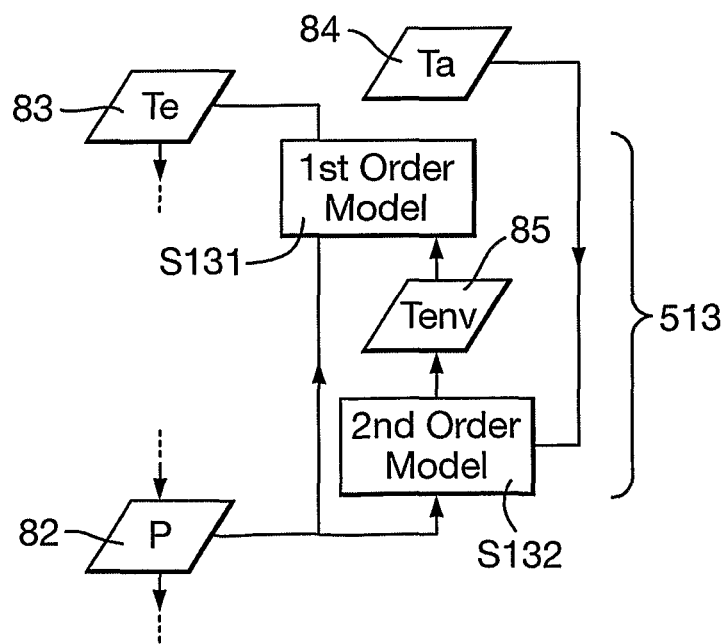
FIG. 11 is flow chart illustrating a modification to the flow chart of FIG. 9.

Therefore the accuracy of the open-loop control may be improved by adapting the thermal model used in step S13 as shown in FIG. 11 to model this extra thermal creep using a two order model.

In particular, the control unit 52 maintains an estimate Tenv of the temperature of the environment around the SMA actuator 30 as data 85 as well as an estimate Te of the instantaneous value of the temperature of the SMA actuator 30. Thus step S13 is adapted to consist of two steps each using a two order model of the thermal model.

In step S131, the estimated value Te of the instantaneous temperature of the SMA actuator 30 as data 83 is updated in accordance with the equation previously set out for step S13 which represents the first order of the thermal model. However in this case the assumed temperature Tenv of the environment around the SMA actuator 30 is taken to be the estimate Tenv of the temperature of the environment around the SMA actuator 30 instead of the ambient temperature Ta.

In step S132 the estimate Tenv of the temperature of the environment around the SMA actuator 30 is updated in accordance with the following equation which represents the second order model of the thermal model:

$$dTenv/dt=k3*(P-k4*(Tenv-Ta))$$

where k3 is a constant that represents the inverse of the thermal capacity of the environment around the SMA actuator 30; and k4 is a constant that represents the heat losses from the environment around the SMA actuator 30. The thermal model thus takes account of the ambient temperature Ta as data 84. Conveniently, the second order model has an identical form to the first order model to aid algorithm complexity and development. However, however, clearly the k3 and k4 values are very different from k1 and k2 of the basic model, because the thermal time constants of the environment are much longer than the thermal time constants of the SMA actuator 30.

Improvements to the thermal model dominate performance. One option is to add a third first-order differential equation to add a further environmental temperature variable, and hence add a further thermal time constant to the thermal model. Indeed the thermal model can be expanded to arbitrary order. There appears to be appreciable benefit in increasing it to 3rd order (i.e. adding a third first-order differential term).

However, as the order becomes higher, it becomes more difficult to separate the effect of the different orders (as described earlier). In this case, a numerical optimisation technique can be useful. This involves choosing a first guess set of coefficients for the thermal model, running a test signal through the actuator, and then adjusting parameters (using a random walk method of coefficient selection).

The time constants $k1$ to $k4$ may have fixed values which are typical of the design of the camera or are measured during manufacture and stored in the control unit 52. As an alternative the values of the time constants $k1$ and $k2$ may be derived from or adjusted by the electrical characteristics measured during the calibration stage (step S2). In principle, the values of the time constants $k3$ and $k4$ could be derived in the same manner but in practice the time constants are so long as to make this undesirable.

The values of the time constants $k1$ to $k4$ may be derived as follows.

In general terms, once the linear resistance region between the local maximum 60 and local minimum 61 is found, it is possible to apply a step change in power to move between two positions in the linear region (and hence move between two measurable resistances). The time constant to move between the two positions can be measured by monitoring the SMA actuator 30 resistance. This information can be used to determine the ratio of $k1$ and $k2$ (if done quickly enough to be able to neglect changes in the temperature of the immediate environment around the SMA actuator 30).

In addition, it is possible to determine the change in power required to move between two SMA actuator 30 resistance values in the linear resistance region between the local maximum 60 and local minimum 61. One convenient option is to measure the change in power when moving from the limit near the local maximum 60 to the limit near the local minimum 61 as this can be estimated to correspond to a particular change in the strain of the SMA actuator 30, and hence position. Although given the requirements for measuring parameters for other models, the power difference between two other points in the resistance range may be used. The change in power can be related to the thermal capacity of the SMA actuator 30 for the specific module being calibrated. So for example if the particular actuator 30 has a larger diameter, the thermal capacity is higher, therefore the power required to heat up the actuator 30 between the two resistances will also be higher. Therefore, in effect, the change in power correlates to the SMA actuator 30 diameter, which in turn correlates to the value of $k2$.

Therefore, since there are two constants in the model, and two pieces of information can be derived during calibration, it is possible to adjust the values of the constants separately. Of course, the adjustment will require detailed characterisation of a series of modules to ensure the adjustments are appropriate. It is also noted that the possible adjustment algorithms as defined help compensate for the major causes of module-to-module variation, but will not pick up on all the sources of variation, and so still represent estimates of performance.

Characterisation of actuator modules allows that design of the model that determines effective temperature, based on the SMA actuator 30 temperature and the temperature of the environment around the SMA actuator 30. It is then straightforward to calculate the effective actuator 30 temperature at each time interval, based on the calculations of SMA actuator 30 temperature and environmental temperature.

A detailed illustration is as follows.

One mechanism for associating real powers with estimated temperatures is by monitoring steady state power. In conditions where a steady power is being applied to the device, it can be said that all parameters of the system relevant to lens displacement (both real and imaginary) must have converged to steady values. Therefore, it can be said that $dTe/dt=0$ and therefore the steady state power Psteady for a steady state temperature Tsteady is given by the equation:

$$P\text{steady}=k2.(T\text{steady}-T\text{env})$$

This relationship is generally useful and is used at many points during model calibration.

The dynamic response is given by the equation:

$$Te(t)=T\text{env}+(P/k2)+(P/k2-Te(t=0))\exp(-k1.k2.t)$$

That is, for a given constant power input, the model temperature will vary according to a decaying exponential.

Only constant $k2$ affects the steady-state power. This can be thought of as setting the gain for the model, ie the scaling of temperature with power. The value of $k2$ is not critical, as it is inevitably subsumed into the unknown gain of power to position for the particular module at some point. However, it is useful to keep the model close to reality—it means that it is easy to build on additional assumptions. Therefore $k2$ can be set under laboratory conditions by measuring or estimating actuator 30 temperature rise for a given steady-state power input. There is also a dynamic method of setting $k2$ based on a measure of the ambient temperature Ta. If constant power at Rmax is measured as PRmax, then $k2$ is given by the equation:

$$k2=P\text{Rmax}/(T\text{ref}-Ta)$$

For example if PRmax is found to be 60 mW, Tref (start of phase transition) for the system is 80° C. and Ta was determined to be 20° C. by resistance detection methods, then $k2$ would equal 1 mW/° C.

$k1$ influences the dynamic response of the system. The system described has a simple first-order roll-off, with a turnover (−3 dB) frequency of $(k1k2)$. The ideal is to match the response of the thermal model to the mechanical response of the camera when in its active region (this is because, in the active region, there is a very linear relationship between temperature, position and resistance). The module can be biassed to a certain position in its linear range, and then a step change in power can be applied. The system will tend to exponentially converge to a new lens position and resistance, with both of these having the same time constant. The time constant can be measured either under laboratory conditions, or on the fly using the resistance signal, and is simply the time taken for 63.2% of the final position or resistance change to occur. The time constant t is $(1/k1.k2)$. Therefore if the time constant of the system is measured at 100 ms, then $k2=(1/k1.\tau)=10°$ C./mJ.

So, both $k1$ and $k2$ can be determined in real-time with the system, but can also be provided from off-line data. Real-time and off-line measurements can be mixed.

The previous calibration made use of a measure of 'steady state power'. Measuring steady-state power is relatively simple, even when the system is being driven with a PWM signal (i.e. where the drive current is varying rapidly). In this case, the PWM demand must be low-pass filtered at a rate which limits the response to the thermal bandwidth of the actuator 30 (in our system, around 4 Hz). This can be achieved using a 1st order IIR filter, or similar structure. Determining when 'steady-state' has been achieved is obviously a matter of degree—our system checks that the resistance gradient is sufficiently low ($dR/dt<36$ mΩ/ms, on the basis that if resistance has converged, then power also will have converged sufficiently). Power gradient $dP/dt$ is not measured directly because power input will depend on some very long time constant effects which are not relevant to this calibration procedure.

It has been mentioned that the first-order thermal model of the SMA actuator 30 temperature can be surrounded by another first order model which approximates the immediate environment temperature. This is an advantage because the temperature of the parts inside the camera module will start to drift as power is dissipated into the module. These parts generally have a very long time constant (e.g. between 1 and 10 seconds), therefore it is broadly impractical to calibrate this in real time, although similar principles apply.

Examining the system in detail, obviously the same formulae apply to the outer model. All of the equations for the inner model are valid so long as all the tests are done on a timescale which is not significant compared with the time constant of the outer model (in our case, the outer time constant is generally greater than 1 second). Thus, the difference in actual or estimated temperature between the initial settle (i.e. <1 second) and long term settle (>>10 seconds) can be accommodated by adjusting k4. Again, there are a variety of ways that this can be determined. One is by monitoring the power input to the actuator 30 when closed-loop control is active over a long period. The difference in power between the short and long term settling powers gives information about k4. These powers can be related to temperature by using scaling factor k2 of the inner model.

Again, the time constant t of the outer model is set by (1/k3.k4). The time constant of the outer loop is determined from the time taken for the signal to complete 63.2% of the remaining change once an initial quasi-steady state is reached.

When measuring a system, it may be concluded that there is 0.5° C. change in environment temperature in the long-term when a power of 60 mW is applied, and it occurs with a time constant of 10 seconds. In this case, k4=120 mW/° C. and k3=0.833° C./J.

Figure 12:
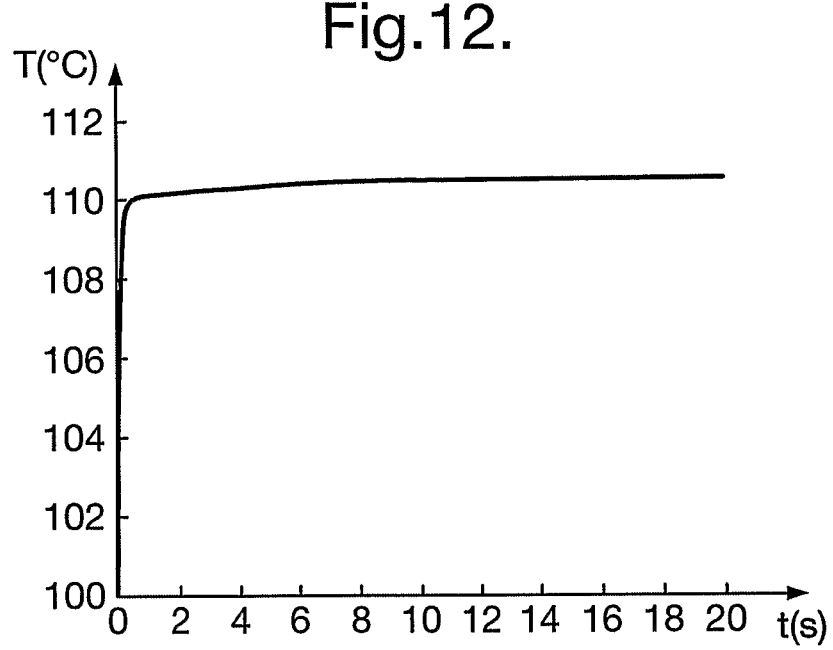
FIG. 12 is a graph of temperature response of the SMA actuator to a step change in power.

For illustration, FIG. 12 shows an example of the resultant dual time-constant response which results from a step change in power. In this example, the inner loop constants should be set on the basis of the quasi-steady state which is reached at approximately 0.5 seconds. The outer loop constants should be set on the basis of the steady state which is reached at 20 seconds.

It is worth noting that if the optional second order model is used, then it is normally set up for a much longer time-constant than the first order model. This means that it can be advantageous to use a multi-rate model, where the actuator 30 temperature is updated quickly (every cycle at 1.5 kHz), but the environment temperature is updated more slowly (for example, every 256th cycle). This helps maintain coefficient precision.

There are two options for implementing open-loop control, the first option being a mixed mode in which open-loop control is applied in combination with closed-loop control and the second option being to use only open-loop control.

In the first option of a mixed mode, the closed-loop control may be used to drive movement of the movable element 6 across a first range of movement being the linear region within which the length of the SMA actuator is longer than at the local minimum resistance, for example the range Δx1 in FIG. 3. In this case the open-loop control is used to drive movement of the movable element 6 across a second range of movement within which the length of the SMA actuator is shorter than in the first range of movement, for example the range Δx2 in FIG. 3. Thus it can be seen that the mixed mode allows the overall range of movement to be extended beyond that available from using closed-loop control only.

Figure 13:
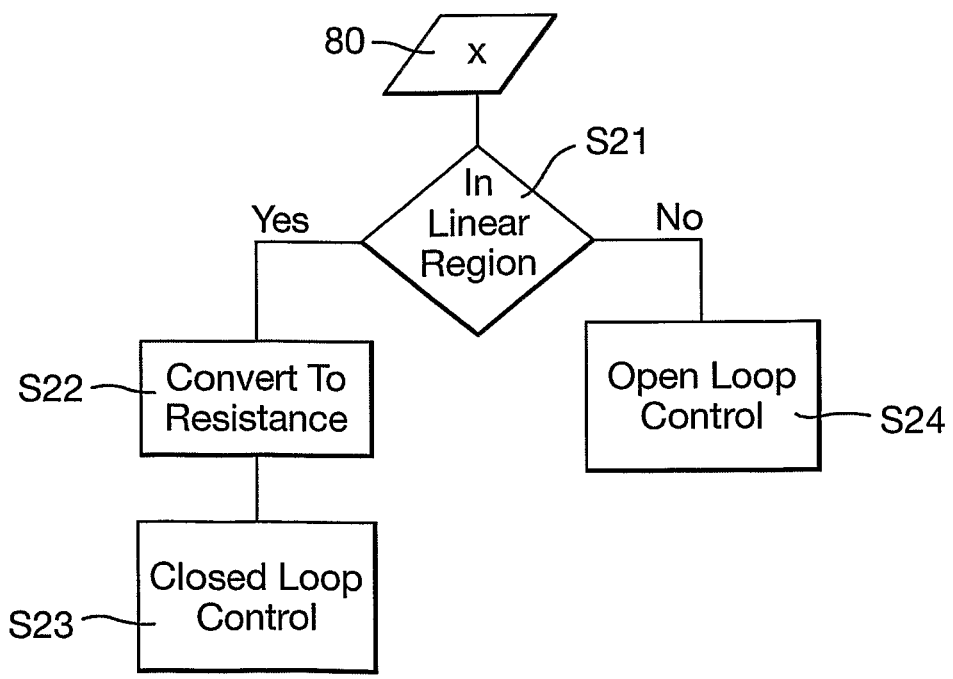
FIG. 13 is a flow chart illustrating the operation of the control unit in a mixed mode.

An example of the control implemented by the control unit in the mixed mode is shown in FIG. 13.

Based on the demanded position x as data 80, in step S21 it is determined whether the demanded position x is in the first range of movement. If so, then the operation proceeds to step S22 where the position demand x is converted to a target resistance Rt in accordance with the equation:

$$Rt = R\max - \lambda 1.x$$

Subsequently in step S23, closed-loop control of the SMA actuator 31 is provided based on the target resistance Rt as described above.

If it is determined in step S21 that the demanded position x is not in the first range of movement, then the operation proceeds to step S23, where open-loop control is performed based on the demanded position as described above.

One example of how this may work is in the calibration stage (step 2), during which the SMA actuator 30 is heated up. The resistance is measured at module turn on. On further heating, the resistance Rmax of the local maximum 60 is noted, and from this an upper resistance limit is set a predetermined decrement therebelow. On further heating, the resistance Rmin of the local minimum 61 is noted, and subsequently lower resistance limit is set a predetermined increment thereabove. Subsequently in the operation stage (step 3) operation proceeds in accordance with FIG. 13. Thus if throughout this movement, the SMA actuator 30 remains in the linear closed-loop region, the control is entirely closed-loop. However, if during this movement, the lower resistance limit is reached, then control is transferred to the open-loop algorithm. One option is to use the power that is required to hold position at the limit of the closed-loop region near the resistance minimum. Then use the open-loop model of power versus temperature and temperature versus position, along with the closed-loop resistance versus position to estimate the change in power required that corresponds to the error in resistance between the resistance at the closed-loop limit and the target closed-loop resistance. This change in power is then added to the absolute power to hold the limit near the minimum resistance to give the power required for the target position.

In this way, the open-loop models are used to extrapolate from the closed-loop region. Indeed the parameters setting the open-loop model may be at least in part determined during the specific operational cycle of the move. This means that it is possible to determine or refine estimates for some constants whilst the device is in use. If an extrapolation approach is being used, and control is transitioning from closed to open-loop, then it is normally possible to re-evaluate or refine the power estimate that will be used as a reference for the open-loop section before transitioning to the open-loop controller. This does, however, add extra time, and is therefore not necessarily advantageous. Alternatively, all the parameters may be set during the start-up calibration cycle and when a demanded resistance outside the linear region is received, control is transferred to the open-loop model.

This option, where both the open-loop and closed-loop control are used together during operation has been dubbed a 'mixed mode' algorithm. The advantage is that all the benefits of the closed-loop algorithm are still present, including optimum positional accuracy, repeatability and linearity in the closed-loop region. However, this algorithm is also characterised by difficulties in lining up the responses where control is switched between the open-loop and closed-loop algorithms. The worse problem is if there are unaddressable positions between the regions controlled by the closed-loop and open-loop algorithms. Therefore to combat this, there is overlap between the regions. However this leads to difficulties in monotonicity, where with incrementally increasing commands, there could be a drop in position as control transitions between the algorithms. Although some auto-focus algorithms may be tolerant of such discontinuities, many are not, and so this problem is a showstopper. There are possible blend algorithms to ensure the response is monotonic ('blend' refers to options where the open and closed-loop models are run at the same time and their answers are combined in varying proportion to generate the control signal). However this degrades the linearity on the closed-loop region, whilst adding processing overhead. Therefore the benefits of operating mixed mode are reduced.

The second option is to carry out all operational movements in step S2 using open-loop control as described above. This removes the problems with monotonicity, although in the middle range of travel, the linearity and repeatability will be worse than with closed-loop control.

Therefore with this methodology, start-up stage (step S2) is used to find the ambient temperature, and set and scale open-loop model parameters based on measurements of resistance and power. However, once the models are scaled, all subsequent operation of the module is done using the open-loop models. Therefore, during operation, the distinction between the closed-loop linear resistance region, and the non-linear region is lost.

The method described above is relatively basic. No direct measurement is made of the displacement of the movable element 6 which is assumed to scale linearly in the system (that is, devices will have an 'activity' which just linearly scales the output, which is therefore not corrected). Also, the measurements made only accommodate the zeroth order of hysteresis (that is, the bulk power offset between heating and cooling). However it is believed that in the case of a camera there is only limited gain to be had by improving these models. Calibrating displacement is difficult and generally unnecessary, as auto-focus search methods generally work based on relative movements, rather than absolute. Even if the actuator is 100% accurate in terms of step size, the focal length of the lens will be inaccurate and therefore there is still an unknown effect on focus. As always, these types of tolerance discussions are dominated by RMS considerations, and even reducing the uncertainty in one part to zero will not necessarily have a significant impact on the system performiance.

There are well known, more elaborate, hysteresis models available. An often-cited one is the discrete Preisach model of hysteresis. This type of model can be used either at the front of the calculation chain (i.e. a modifier which applies to the desired position) or at the back end of the calculation chain (i.e. a modifier which applies to the desired temperature). The Preisach model can be scaled such that the 'eye opening' at the mid point of the outer hysteresis loops match the measurements of TRMid-heat and TRMid-cool. However as mentioned earlier, these types of improvement are rarely justified in the face of the significant extra complexity of adding them.

The various types of control described above may be used to drive the movement of the movable element 6 to change its position. In the case of the camera 1 this changes the focus of the lens system 7. The focus may be changed in accordance with any desired algorithm.

The focus may be changed to provide an auto-focus algorithm. One option is to use a flyback algorithm as disclosed in WO-2007/113478; WO-2008/099156; or WO-2008/099155. In this case, the lens system 7 is always moved into position by heating. Thus on cooling the position does not need to be accurately controlled. In the case of closed-loop control, this avoids the problem of hysteresis in the relationship between position and resistance. However, it has been noticed that as the mechanical stress applied to the SMA actuator 30 increases, this particular form of hysteresis reduces in that the relationship between position and resistance during heating and cooling becomes closer. In the case of closed-loop control, the flyback algorithm avoids the need to use the second curve 91 described above, thereby simplifying the control.

An alternative, more standard option for providing an auto-focus algorithm is to use a conventional "hill climbing" auto-focus algorithm. In this case the algorithm homes in on the desired position from either direction. In this case, it is necessary to find and maintain a given position from both directions, and therefore it is necessary to characterise and compensate for the hysteresis associated with the SMA actuator 30. By necessity this adds complexity to the open-loop models and means that more parameters need to be set based on measurements during the start-up calibration process.

The invention claimed is:

1. A method of determining the ambient temperature of an SMA actuation arrangement comprising an SMA actuator arranged on contraction caused by heating to drive movement of a movable element relative to a support structure, the method comprising:
   supplying drive current through the SMA actuator, wherein, when the SMA actuator is in an unheated state, the drive current is applied initially to cause a resistance of the SMA actuator to rise to a local maximum resistance;
   detecting a measure of the resistance of the SMA actuator and controlling the drive current on the basis of the measure of the resistance of the SMA actuator; and
   deriving a measure of an electrical characteristic of the SMA actuator that is representative of the ambient temperature, said electrical characteristic of the SMA actuator being the difference between the resistance of the SMA actuator in the unheated state when the drive current is initially applied and the maximum resistance of the SMA actuator.

2. A method according to claim 1, wherein said measure of said electrical characteristic of the SMA actuator is said difference between the resistance of the SMA actuator in the unheated state when the drive current is initially applied and the maximum resistance of the SMA actuator, divided by a characteristic resistance of the SMA actuator.

3. A method according to claim 2, wherein the SMA actuator has a property that resistance varies with length along a curve on which the resistance decreases from a local maximum resistance to a local minimum resistance during contraction, said characteristic resistance of the SMA actuator being one of the local maximum resistance, the local minimum resistance or a linear combination of the local maximum resistance and the local minimum resistance.

4. A method according to claim 1, wherein the drive current is controlled taking account of said measure of said electrical characteristic of the SMA actuator.

5. A method of determining the ambient temperature of an SMA actuation arrangement comprising an SMA actuator arranged on contraction caused by heating to drive movement of a movable element relative to a support structure, wherein the SMA actuator has a property that resistance varies with length along a curve on which the resistance decreases from a local maximum resistance to a local minimum resistance during contraction, the method comprising:

supplying drive current through the SMA actuator;

detecting a measure of the resistance of the SMA actuator and controlling the drive current on the basis of the measure of the resistance of the SMA actuator; and deriving a measure of an electrical characteristic of the SMA actuator that is representative of the ambient temperature, said electrical characteristic of the SMA actuator being the power of the drive current required to hold the resistance of the SMA actuator at a predetermined level relative to the maximum resistance and/or minimum resistance of the SMA actuator.

6. A method according to claim 5, wherein the predetermined level is a linear combination of the maximum resistance and minimum resistance of the SMA actuator.

7. A method according to claim 5, wherein the predetermined level is in the central 80% of the range from the maximum resistance to the minimum resistance of the SMA actuator.

8. A method according to claim 5, wherein the drive current is controlled taking account of said measure of said electrical characteristic of the SMA actuator.

9. A control system for an SMA actuation arrangement comprising an SMA actuator arranged on contraction caused by heating to drive movement of a movable element relative to a support structure, the control system comprising:

a current source operative to supply drive current through the SMA actuator to heat the SMA actuator;

a detector circuit operative to detect a measure of the resistance of the SMA actuator; and a control unit operative to control the current source and to control the power of the drive current on the basis of the detected measure of the resistance of the SMA actuator, wherein the control unit is operative, when the SMA actuator is in an unheated state, to initially apply the drive current to cause the resistance of the SMA actuator to rise to a local maximum resistance, wherein the control unit is arranged to derive a measure of an electrical characteristic of the SMA actuator that is representative of the ambient temperature, said electrical characteristic of the SMA actuator being the difference between the resistance of the SMA actuator in the unheated state when the drive current is initially applied and the maximum resistance of the SMA actuator.

10. A control system according to claim 9, wherein said measure of said electrical characteristic of the SMA actuator is said difference between the resistance of the SMA actuator in the unheated state when the drive current is initially applied and the maximum resistance of the SMA actuator, divided by a characteristic resistance of the SMA actuator.

11. A control system according to claim 10, wherein the SMA actuator has a property that resistance varies with length along a curve on which the resistance decreases from a local maximum resistance to a local minimum resistance during contraction, said characteristic resistance of the SMA actuator being one of the local maximum resistance, the local minimum resistance or a linear combination of the local maximum resistance and the local minimum resistance.

12. A control system according to claim 9, wherein the control unit is operative to control the power of the drive current taking account of said measure of said electrical characteristic of the SMA actuator.

13. A method of controlling an SMA actuation arrangement comprising an SMA actuator arranged on contraction caused by heating to drive movement of a movable element relative to a support structure, the method comprising:

supplying drive current through the SMA actuator to heat the SMA actuator;

detecting a measure of the resistance of the SMA actuator, generating a closed-loop control signal for controlling the power of the drive current supplied by the current source on the basis of an error between the measure of the resistance of the SMA actuator detected by the detector circuit and a target value for the resistance of the SMA actuator, after generation of the control signal, adding an offset to the control signal which reduces the steady-state value of said error, the power of the drive current supplied by the current source being controlled in accordance with the control signal having the offset added thereto.

14. A method according to claim 13, wherein said offset has a value which is dependent on a measure of the ambient temperature.

15. A method according to claim 14, wherein
the SMA actuator has a property that resistance varies with length along a curve on which the resistance decreases from a local maximum resistance to a local minimum resistance during contraction, the method comprises deriving a measure of the power of the drive current required to hold the resistance of the SMA actuator at a predetermined level relative to the maximum resistance and/or minimum resistance of the SMA actuator, and said offset has a value which is dependent on the derived measure of the power of the drive current.

16. A method according to claim 14, further comprising determining the measure of ambient temperature by deriving a measure of an electrical characteristic of the SMA actuator that is representative of the ambient temperature.

17. A method according to claim 13, wherein said offset has a value which is dependent on the degree of contraction of the SMA actuator.

18. A method according to claim 13, wherein said offset has a value which is dependent on whether the SMA actuator is being heated or is cooling.

19. A method according to claim 13, wherein said offset has a fixed value.

20. A control system for an SMA actuation arrangement comprising an SMA actuator arranged on contraction caused by heating to drive movement of a movable element relative to a support structure, wherein the SMA actuator has a property that resistance varies with length along a curve on which the resistance decreases from a local maximum resistance to a local minimum resistance during contraction, the control system comprising:

a current source operative to supply drive current through the SMA actuator to heat the SMA actuator;

a detector circuit operative to detect a measure of the resistance of the SMA actuator; and a control unit operative to control the current source and to control the power of the drive current on the basis of the detected measure of the resistance of the SMA actuator, wherein the control unit is arranged to derive a measure of an electrical characteristic of the SMA actuator that is representative of the ambient temperature, said electrical characteristic of the SMA actuator being the power of the drive current required to hold the resistance of the SMA actuator at a predetermined level relative to the maximum resistance and/or minimum resistance of the SMA actuator.

21. A control system according to claim 20, wherein the predetermined level is a linear combination of the maximum resistance and minimum resistance of the SMA actuator.

22. A control system according to claim 20, wherein the predetermined level is in the central 80% of the range from the maximum resistance to the minimum resistance of the SMA actuator.

23. A control system according to claim 20, wherein the control unit is operative to control the power of the drive current taking account of said measure of said electrical characteristic of the SMA actuator.

24. A control system for an SMA actuation arrangement comprising an SMA actuator arranged on contraction caused by heating to drive movement of a movable element relative to a support structure, the control system comprising:
   a current source operative to supply drive current through the SMA actuator to heat the SMA actuator;
   a detector circuit operative to detect a measure of the resistance of the SMA actuator; and
   a control unit operative to generate a closed-loop control signal for controlling the power of the drive current supplied by the current source on the basis of an error between the measure of the resistance of the SMA actuator detected by the detector circuit and a target value for the resistance of the SMA actuator,
   wherein the control unit is operative, after generation of the control signal, to add an offset to the control signal which reduces the steady-state value of said error, the control signal having the offset added thereto being supplied to control the power of the drive current supplied by the current source.

25. A control system according to claim 24, wherein said offset has a value which is dependent on a measure of the ambient temperature.

26. A control system according to claim 25, wherein
   the SMA actuator has a property that resistance varies with length along a curve on which the resistance decreases from a local maximum resistance to a local minimum resistance during contraction,
   the control unit is arranged to derive a measure of the power of the drive current required to hold the resistance of the SMA actuator at a predetermined level relative to the maximum resistance and/or minimum resistance of the SMA actuator, and
   said offset has a value which is dependent on the derived measure of the power of the drive current.

27. A control system according to claim 24, wherein said offset has a value which is dependent on the degree of contraction of the SMA actuator.

28. A control system according to claim 24, wherein said offset has a value which is dependent on whether the SMA actuator is being heated or is cooling.

29. A control system according to claim 24, wherein said offset has a fixed value.

30. A control system according to claim 25, wherein the control unit is arranged to derive a measure of an electrical characteristic of the SMA actuator as said measure of the ambient temperature.

* * * * *